United States Patent Office 3,197,450
Patented July 27, 1965

3,197,450
PROCESS FOR MAKING POLYVINYL ALCOHOL
AND DIMETHYLACETAMIDE
Kwan C. Tsou, Huntingdon Valley, Pa., assignor to The
Borden Company, New York, N.Y., a corporation of
New Jersey
No Drawing. Filed Sept. 13, 1962, Ser. No. 223,537
6 Claims. (Cl. 260—91.3)

This invention relates to the concurrent manufacture of polyvinyl alcohol (PVA) and N-dialkyl-substituted aliphatic acid amides; in particular dimethylformamide and dimethylacetamide.

The uses of PVA are well known. Dimethylformamide and dimethylacetamide and other dialkyl substituted amides are solvents for such polymers as polyacrylonitrile, polyvinyl acetate, and nylon. These solvents also act as swelling agents for PVA. They affect the crystallinity or hydrogen bonding in PVA and speed up its reaction with other compounds, such as alkylene oxides used in the preparation of alkoxylated PVA.

Heretofore, the procedures used for the preparation of PVA and dialkyl-substituted aliphatic amides have not been entirely satisfactory.

PVA is commonly prepared by the hydrolysis of polyvinyl acetate using a catalyst such as sodium alkoxide. The use of such catalysts contributes to the residual alkalinity and ash content in the final product (PVA), both of which are undesirable.

The aliphatic amides have been most generally prepared by reacting an aliphatic acid or its ester with a dialkylamine under conditions of elevated temperature and pressure followed by purification of the mixture by distillation and extraction. The use of high temperatures and pressures renders such process commercially unsuitable.

These difficulties are obviated by the present invention which provides a method for the concurrent preparation of PVA and dialkyl-substituted aliphatic amides. Not only are the prior art difficulties obviated, but the end mixture of PVA and dialkyl-substituted aliphatic amide can be used as such for the subsequent reaction; e.g., the alkoxylation of PVA.

Briefly stated, the present invention comprises forming a solution of a polyvinyl ester and an alcohol solvent therefor and reacting the resultant alcoholic ester solution with an unsubstituted $C_1$–$C_8$ dialkylamine to concurrently product polyvinyl alcohol and a dialkyl-substituted aliphatic amide.

The PVA made by the present invention will have, as is true of PVA made by other processes, properties that vary according to the molecular weight of the parent polyvinyl ester and the extent of hydrolysis. As noted later herein, the degree of hydrolysis can be controlled by varying the time of the reaction.

The dialkyl-substituted aliphatic amides of the present invention correspond to the formula:

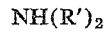

where R represents hydrogen or a $C_1$ to $C_4$ alkyl group and R' is selected from the group consisting of $C_1$ to $C_8$ alkyl groups. The unsubstituted alkyl groups are preferred. Specific examples of the amides are dimethyl-, diethyl-, dibutyl-, and di-(2-ethylhexyl) formamides and the corresponding acetamides, pripionamides, and butyramides.

As to materials, the polyvinyl esters used are polyvinyl acetate, polyvinyl formate, polyvinyl butyrate, and polyvinyl propionate. The molecular weights of these esters can vary dependent upon the characteristics desired in the PVA to be produced. Of all the esters, polyvinyl acetate is preferred.

The dialkylamine employed corresponds to the formula:

$$NH(R')_2$$

in which R' is selected from the group consisting of unsubstituted $C_1$ to $C_8$ alkyl groups. Specific examples are dimethylamine, diethylamine, and dihexylamine with the dimethylamine being preferred.

The alcohol solvent for the polyvinyl ester is preferably methanol. Other alcohols such as ethanol and methoxyethanol can be used, but they are not as satisfactory.

In carrying out the process of the present invention there is prepared first an alcoholic polyvinyl ester solution which is cooled to at least about 0° C. to about —10° C.

Cooling to at least about 0° C. is required in order to saturate the solution with the dialkylamine.

The dialkylamine is then added and the moisture stirred until the reaction is completed. Atmospheric pressure can be used but a pressure of about 25–50 p.s.i. is preferred throughout the reaction. The temperature is allowed to rise from 0° C. and maintained within the range 0° C. to 75° C., with 3°–40° C. being the optimum.

The length of reaction is dependent upon the degree of hydrolysis desired of the polyvinyl ester and the amount of amide wanted. If the reaction is allowed to proceed until it terminates, PVA with substantially all the ester groups hydrolyzed and the largest amount of amide will be produced.

As to proportions, equimolar ratios of the polyvinyl ester and dialkyl-amine are used. It is preferred to use a molar excess of the amine in order to completely react the ester. Preferably, 100 parts to 500 parts by weight of the alcohol solvent are used for every 100 parts by weight of the polyvinyl ester.

When the reaction is terminated the PVA can be removed from the reaction mixture by filtration and the dialkyl-substituted aliphatic amide obtained by distilling off the alcohol and any ester formed by alcoholysis of the polyvinyl ester. If desired, the alcohol and alcoholysis ester may be removed by distillation, and the PVA and dialkly-substituted amide mixture used for subsequent reaction; e.g., alkoxylation of the PVA.

The following specific examples are illustrative of the invention, wherein the parts are by weight, unless otherwise stated.

Example 1

100 parts of polyvinyl acetate were dissolved in 200 parts by volume of methanol in a pressure reaction vessel and cooled to 0° C. 100 parts of dimethylamine was added and the mixture agitated for 45 hours at 40° C. and 30 p.s.i. pressure at which time the reaction had terminated.

The polyvinyl alcohol (29 parts) was removed by filtration and washed three times with methanol. The PVA was obtained as a white powder, had 97% of the acetate groups hydrolyzed, and was ash free.

After removal of the PVA from the reaction mixture the methanol was removed by distillation and 30 parts of dimethyl acetamide were obtained.

Example 2

The procedure as set forth in Example 1 was carried out, with the exception that the PVA was not removed from the mixture, but the methanol and methyl acetate were removed by distillation under vacuum and with continuous stirring. The mixture of PVA and dimethylacetamide that remained was used to prepare ethoxylated PVA by the addition of ethylene oxide as described in copending application Serial No. 105,866, filed April 27, 1961.

Example 3

The procedure as set forth in Example 1 is followed except that polyvinyl formate, polyvinyl propionate, and polyvinyl butyrate are substituted for the polyvinyl acetate. In all instances polyvinyl alcohol and the corresponding amide are obtained.

Example 4

The procedure as set forth in Example 1 is followed except that diethylamine, dibutylamine, and di-(2-ethylhexyl) amine are substituted for the dimethylamine. The reaction does not proceed as rapidly, but polyvinyl alcohol and the corresponding amides are produced.

It will be understood that it is intended to cover all changes and modifications of the examples of the invention herein chosen for the purpose of illustration which do not constitute departures from the spirit and scope of the invention.

I claim:

1. The process of concurrently preparing polyvinyl alcohol and an N-dialkyl-substituted aliphatic acid amide which comprises
    (a) forming a solution comprising a mole of a polyvinyl ester selected from the group consisting of polyvinyl formate, polyvinyl acetate, polyvinyl propionate, and polyvinyl butyrate in an alcohol selected from the group consisting of methanol and ethanol,
    (b) introducing into the resulting solution about a mole at least of a reactant consisting essentially of a $C_2$ to $C_{16}$ dialkylamine and
    (c) maintaining contact between the ester and amine at a temperature of about 0°–75° C. until the ester is hydrolyzed to polyvinyl alcohol and the amine is converted to an N-dialkyl-substituted aliphatic acid amide, the proportion of the alcohol used being about 100–500 parts by weight for 100 parts of said ester.

2. The process of concurrently preparing polyvinyl alcohol and an N-dialkyl-substituted aliphatic acid amide which comprises:
    (a) forming a solution comprising a mole of a polyvinyl ester selected from the group consisting of polyvinyl formate, polyvinyl acetate, polyvinyl propionate, and polyvinyl butyrate and an alcoohl solvent for said ester,
    (b) cooling said alcoholic ester solution to at least about 0° C., and
    (c) reacting said alcoholic ester solution with about a mole at least of an unsubstituted $C_2$ to $C_{16}$ dialkylamine until the ester is hydrolyzed to polyvinyl alcohol and the amine is converted to the N-dialkyl-substituted aliphatic acid amide, the proportion of the alcohol used being about 100–500 parts by weight for 100 parts of said ester.

3. The process according to claim 1 wherein the polyvinyl ester is polyvinyl acetate and the unsubstituted dialkylamine is dimethylamine.

4. The process according to claim 1 wherein the polyvinyl ester is polyvinyl formate and the unsubstituted dialkylamine is dimethylamine.

5. The process of concurrently preparing polyvinyl alcohol and dimethylacetamide which comprises:
    (a) forming a solution consisting essentially of a mole of polyvinyl acetate and methanol,
    (b) cooling said solution to a temperature within the range of about 0° C. to about −10° C., and
    (c) adding about a mole at least of dimethylamine to said solution and reacting it with said ester at a pressure of about 25 to about 50 p.s.i. and at a temperature within the range of about 0° C. to about 75° C. for a time sufficient to hydrolyze substantially all the ester to polyvinyl alcohol and convert the amine to dimethylacetamide, the proportion of the alcohol used being about 100–500 parts by weight for 100 parts of said ester.

6. The process according to claim 1 wherein said contact between the ester and amine is effected under a pressure of about 25 to 50 pounds per square inch.

References Cited by the Examiner

UNITED STATES PATENTS 2,527,709    10/50    Danforth _____ 260—583

FOREIGN PATENTS 454,425    9/36    Great Britain.

OTHER REFERENCES

Noller: Chemistry of Organic Compounds (only p. 244 relied upon), 2nd edition, Saunders, 1957 (Phila.).

JOSEPH L. SCHOFER, *Primary Examiner.*

WILLIAM H. SHORT, *Examiner.*